United States Patent Office 3,836,502
Patented Sept. 17, 1974

3,836,502
PAINTABLE SILICONE ELASTOMER
Jay R. Schulz, Bangor Township, Bay County, Mich., assignor to Dow Corning Corporation, Midland, Mich.
No Drawing. Filed Feb. 16, 1973, Ser. No. 333,240
Int. Cl. C08g 51/04
U.S. Cl. 260—37 SB    11 Claims

ABSTRACT OF THE DISCLOSURE

Mixing a hydroxyl endblocked polydimethylsiloxane, a filter, an alkoxy silicon compound, such as n-propylorthosilicate,

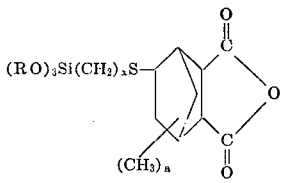

and a metal carboxylate provides a room temperature vulcanizable silicone elastomer composition which cures to provide an elastomer whose surface can be painted with either a latex base paint or an oil base paint.

---

This invention relates to a method of making a room temperature vulcanizable silicone elastomer composition which cures to provide a paintable surface.

Silicone elastomers are, in general, not paintable. It is advantageous to provide a silicone elastomer with a paintable surface, preferably a surface that may be painted with either a latex base paint or an oil base paint. The need for a paintable silicone elastomer is apparent when an article to be painted contains exposed silicone elastomer surface. If the paint will not adhere to the silicone elastomer surface, the aesthetics are impaired.

Therefore, the object of this invention is to provide a room temperature vulcanizable silicone elastomer composition which has a paintable surface when cured. This object and others will become apparent from the following detailed description.

This invention relates to a method for making a room temperature vulcanizable silicone elastomer composition consisting essentially of mixing (A) 100 parts by weight of a hydroxyl endblocked polydimethylsiloxane having a viscosity of from 1000 to 100,00 cs. at 25° C., (B) from 5 to 200 parts by weight of a filler, (C) from 0 to 14.5 parts by weight of an alkoxy silicon compound selected from the group consisting of ethylorthosilicate, n-propylorthosilicate, ethylpolysilicate and n-propylpolysilicate, (D) from 0.5 to 10 parts by weight of a silane of the formula

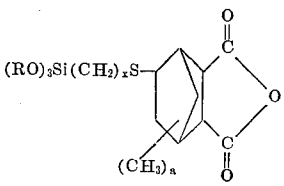

wherein R is methyl, ethyl or propyl, $a$ is 0 or 1, and $x$ is 1, 2, 3 or 4, the combination of (C) and (D) providing from 1 to 15 parts by weight per 100 parts by weight of (A), and (E) from 0.1 to 5 parts by weight of a metal salt of a carboxylic acid wherein said metal ranges from lead to manganese inclusive in the electromotive series of metals and said carboxylic acid has less than 16 carbon atoms.

The hydroxyl endblocked polydimethylsiloxane of (A) has a viscosity of from 1000 to 100,000 cs. at 25° C., preferably from 1000 to 50,000 cs. at 25° C. These hydroxyl endblocked polydimethylsiloxanes can contain, for the purpose of this invention, small amounts of other organic radicals besides methyl radicals such as ethyl, phenyl, vinyl or 3,3,3-trifluoropropyl. These hydroxyl endblocked polydimethylsiloxanes are well known and can be purchased commercially.

The filler of (B) can be any of the fillers conventionally used in silicone elastomers such as the reinforcing fillers and non-reinforcing fillers. The reinforcing fillers include both the treated and untreated silica fillers such as fume silica. The treated reinforcing silica fillers are well known and can be treated with silanes, silanols, siloxanes both linear and cyclics and silazanes. Other fillers include, titanium dioxide, calcium carbonate, diatomaceous earth, crushed quartz, asbestos, zinc oxide, zirconium silicate and carbon black. The filler can be any one filler or mixtures of two or more.

The alkoxy silicon compound (C) can be ethylorthosilicate, n-propylorthosilicate, ethylpolysilicate and n-propylpolysilicate.

The silane (D) has a formula $$(RO)_3Si(CH_2)_xS-$$

wherein R is methyl, ethyl or propyl $a$ is 0 or 1 and $x$ is 1, 2, 3 or 4. These silanes can readily be prepared by reacting nadic anhydride or nadic methyl anhydride with a mercaptosilane of the formula $(RO)_3Si(CH_2)_xSH$ in the presence of a free radical generator such as ultraviolet light and azo-bis-isobutyronitrile.

The metal salts of carboxylic acids of (E) include those having metals ranging from lead to manganese inclusive in the electromotive series of metals and the carboxylic acids have less than 16 carbon atoms. The metals include lead, tin, nickel, cobalt, iron, cadmium, chromium, zinc and manganese. Examples of the metal carboxylates are dibutyltin diacetate, dibutyltin dilaurate, lead naphthenate, cobalt naphthenate, zinc naphthenate, iron 2-ethylhexoate, lead 2-ethylhexoate, lead 2-ethylhexoate, chromium octoate, dibutyltin dibenzoate, dibutyltin adipate, lead sebacate, dibutyltin dilactate, stannous octoate, dibutyltin di-2-ethylhexoate, and manganese 2-ethylhexoate. The preferred metal carboxylates are the tin salts.

The described ingredients are mixed to provide a room temperature vulcanizable silicone elastomer composition. These compositions cure at room temperature to an elastomer after mixing but have adequate working times for convenient use. Because these compositions cure after mixing, it is preferable for storage to divide the reactive ingredients into at least two packages, so that no one package contains a mixture of the hydroxyl polymer, alkoxy compounds and metal carboxylate. However, the cure rate of the complete mixtures can be reduced by lowering the storage temperature and essentially stopped by freezing the mixture.

The amounts of the ingredients to be mixed and based on 100 parts by weight of hydroxyl endblocked polydimethylsiloxane are 5 to 200 parts by weight filler, 0 to 14.5 parts by weight alkoxy silicon compound, 0.5 to 10 parts by weight anhydride silane and 0.1 to 5 parts by weight metal carboxylate. The combination of alkoxy silicon compound and anhydride silane is from 1 to 15 parts by weight. The preferred compositions contain 10 to 60 parts by weight of filler.

Compositions which contain both alkoxy silicon compounds and anhydride silane preferably contain from 2 to 5 parts by weight of alkoxy silicon compound and from 0.5 to 4 parts by weight of anhydride silane.

Compositions which contain so alkoxy silicon compound (C) preferably contain from 3 to 10 parts by weight anhydride silane.

The compositions can also contain plasticizers which can be low molecular weight hydroxylated polydiorganosiloxane fluids, thixotroping agents, pigments and dyes. These and other conventional additives for silicone elastomers can be used, as long as the paintability of the elastomer is not impaired. It is recommended that additives be tried on an experimental basis before large batches of composition are prepared to determine if paintability is affected.

The cured products of these compositions are elastomers which have paintable surfaces with both latex base paints and oil base paints. In addition to paintable surfaces, the elastomers have improved heat stability and improved adhesion to substrates.

The following examples are presented for illustrative purposes only and should not be construed as limiting the invention which is properly delineated in the claims. Parts where used in the examples are parts by weight unless otherwise specified.

Example 1

A mixture of 196 grams of gamma-mercaptopropyltrimethoxysilane and 178 grams of nadic methyl anhydride was irradiated for two hours with ultraviolet light. The resulting product had a refractive index of 1.4895 and a formula of

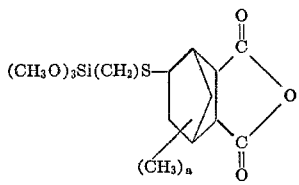

The same product was obtained when 98 grams of gammamercaptopropyltrimethoxysilane, 89 grams of nadic methyl anhydride and a catalytic amount of azo-bis-isobutyronitrile was mixed in a quartz tube. This solution was stirred for 2 days at room temperature, then exposed to ultraviolet light for 3 hours and thereafter stirred for 3 days and a night. The product had a refractive index of 1.4897.

Example 2

A composition was prepared by milling 100 parts of a hydroxyl endblocked polydimethylsiloxane having a viscosity of 12,500 cs. at 25° C. and 30 parts of a fume silica filler having its surface treated to provide trimethylsiloxy units thereon. To the above mixture, 5.5 parts of the anhydride silane of Example 1 and 0.6 part of dibutyltin diacetate was mixed in manually. An open face molding of the above composition was made. The composition cured to an elastomer with a tack free surface in four days. The cured elastomer had a durometer on the Shore A scale of 20, a tensile strength at break of 632 p.s.i., an elongation at break of 855 percent, a tear strength, Die B, of 120 p.p.i. and a modulus at 150 percent elongation of 60 p.s.i. This elastomer is paintable with both a latex base paint and an oil base paint.

Example 3

A composition was prepared by manually mixing into 130 parts of the milled mixture described in Example 2, 4.0 parts of n-propylorthosilicate, 1.0 part of the anhydride silane of Example 1 and 0.25 part of dibutyltin diacetate. The composition was press molded and allowed to cure at room temperature. The cured elastomer had a durometer on the Shore A scale of 32, a tensile strength at break of 845 p.s.i., an elongation at break of 700 percent, a tear strength, Die B, of 124 p.p.i. and a modulus at 150 percent elongation of 101 p.s.i.

The above composition was also cured at room temperature on peel panels which had one-fourth inch wide and one-sixteenth inch thick of cured elastomer thereon. Aluminum and steel strips were used as substrates.

The peel strength with the aluminum substrate was 100 p.l.i., the aluminum strip broke at this value without failure of the elastomer bond. Another aluminum peel panel was placed in boiling water for 3 hours, allowed to dry and then the peel strength was measured. The aluminum strip broke at 104 p.l.i. without failure of the elastomer bond. Another peel panel was placed in an oven at 250° C. for 24 hours. The elastomer discolored but the peel strength was 14 p.l.i. with 100 percent cohesive failure. A control composition prepared as described above without the anhydride silane had a peel strength on an aluminum substrate of 3 p.l.i. after curing and was crumbly after heating for 24 hours at 250° C.

The above peel test where the substrate was steel had a peel strength of 160 p.l.i. after curing, 12 p.l.i. after 3 hours in boiling water (the steel surface was rusted) and 20 p.l.i. after heating in an oven at 250° C. for 24 hours. A control composition prepared as described above without the anhydride silane had a peel strength on a steel substrate of 5 p.l.i. after curing and was crumbly after heating for 24 hours at 250° C.

Cured elastomer strips were painted, one with latex base paint and one with oil base paint. After the paint dried, the Boeing 3M-250 tape test was performed by cutting the surface in a cross hatch manner to form small squares, a tape was firmly pressed over this surface and then pulled off. The amount of paint retention was determined by counting the remaining paint squares adhering to the elastomer and the percentage determined. With both the latex base paint and the oil base paint, there was 100 percent paint retention. A control composition was also painted as described above and had zero percent paint retention for the latex base paint and from 0 to 57 percent paint retention for the oil base paint.

That which is claimed is:

1. A composition consisting essentially of the product obtained by mixing:
   (A) 100 parts by weight of a hydroxyl endblocked polydimethylsiloxane having a viscosity of from 1000 to 100,000 cs. at 25° C.,
   (B) from 5 to 20 parts by weight of a filler,
   (C) from 0 to 14.5 parts by weight of an alkoxy silicon compound selected from the group consisting of ethylorthosilicate, n-propylorthosilicate, ethylpolysilicate and n-propylpolysilicate,
   (D) from 0.5 to 10 parts by weight of a silane of the formula

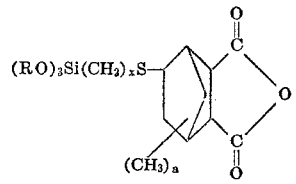

wherein R is methyl, ethyl or propyl, $a$ is 0 or 1, and $x$ is 1, 2, 3 or 4, the combination of (C) and (D) providing from 1 to 15 parts by weihgt per 100 parts by weight of (A), and
   (E) from 0.1 to 5 parts by weight of a metal salt of a carboxylic acid wherein said metal ranges from lead to manganese inclusive in the electromotive series of metals and said carboxylic acid has less than 16 carbon atoms.

2. The composition in accordance with claim 1 in which R is methyl, $x$ is 3, $a$ is 1 and the metal salt in (E) is a tin salt.

3. The composition in accordance with claim 2 in which the tin salt is dibutyltin diacetate and the alkoxy silicon compound of (C) is n-propylorthosilicate.

4. The composition in accordance with claim 1 in which (C) is present in an amount of from 2 to 5 parts by weight and (D) is present in an amount of from 0.5 to 4 parts by weight.

5. The composition in accordance with claim 4 in which the filler is a reinforcing silica filler and is present in an amount of from 10 to 60 parts by weight.

6. The composition in accordance with claim 5 in which R is methyl, $x$ is 3, $a$ is 1 and the metal salt in (E) is a tin salt.

7. The composition in accordance with claim 6 in which the tin salt is dibutyltin diacetate and the alkoxy silicon compound of (C) is n-propylorthosilicate.

8. The composition in accordance with claim 1 in which the amount of (C) present is 0 parts by weight and (D) is present in an amount of from 3 to 10 parts by weight.

9. The composition in accordance with claim 8 in which the filler is a reinforcing silica filler and is present in an amount of from 10 to 60 parts by weight.

10. The composition in accordance with claim 9 in which R is methyl, $x$ is 3, $a$ is 1 and the metal salt in (E) is a tin salt.

11. The composition in accordance with claim 10 in which the tin salt is dibutyltin diacetate and the alkoxy silicon compound of (C) is n-propylorthosilicate.

References Cited

UNITED STATES PATENTS

| | | | |
|---|---|---|---|
| 3,676,420 | 7/1972 | Fulton et al. | 260—37 SB X |
| 3,624,022 | 11/1971 | Ross | 260—37 SB |
| 3,705,120 | 12/1972 | Kawaguchi | 260—37 SB X |

LEWIS T. JACOBS, Primary Examiner

UNITED STATES PATENT AND TRADEMARK OFFICE
CERTIFICATE OF CORRECTION

PATENT NO. : 3,836,502
DATED : September 17, 1974
INVENTOR(S) : JAY R. SCHULZ

It is certified that error appears in the above-identified patent and that said Letters Patent are hereby corrected as shown below:

Column 4, line 49, "20" should read --200--;
column 4, line 66, "weihgt" should read --weight--.

Signed and Sealed this twenty-third Day of December 1975

[SEAL]

Attest:

RUTH C. MASON
Attesting Officer

C. MARSHALL DANN
Commissioner of Patents and Trademarks